March 6, 1945.   J. KAHL   2,370,968
INDEX FOR THERMOMETERS
Filed March 21, 1944
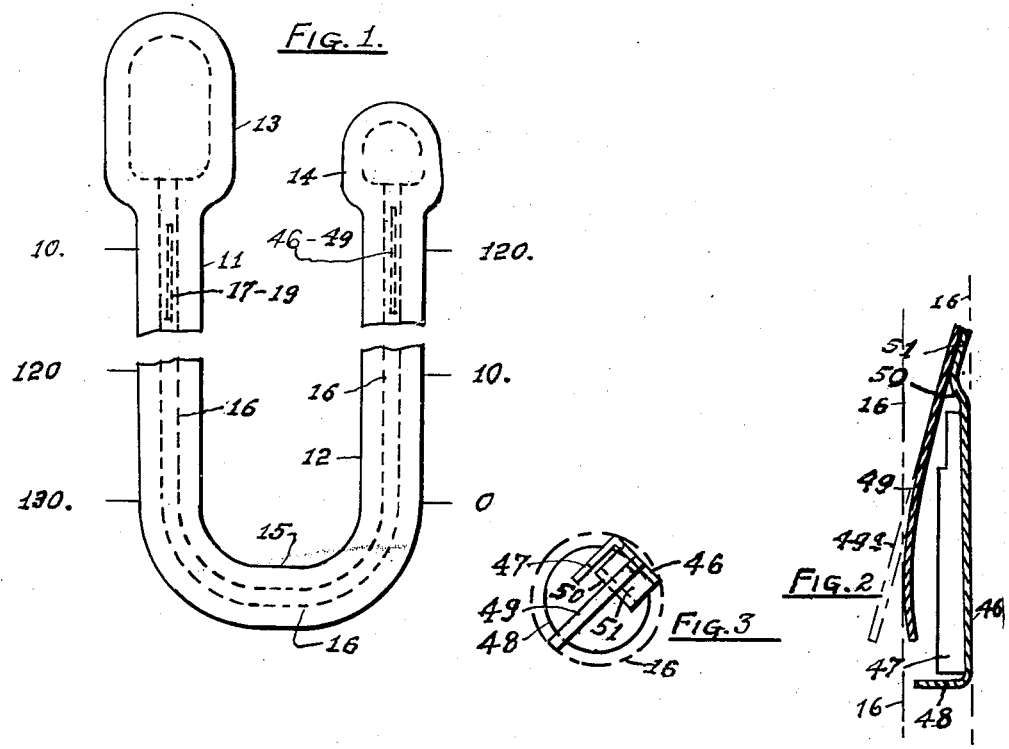
INVENTOR:
Joseph Kahl.
BY Israel Benjamins.
ATTORNEY Patented Mar. 6, 1945

2,370,968

UNITED STATES PATENT OFFICE 2,370,968

INDEX FOR THERMOMETERS

Joseph Kahl, New York, N. Y.

Application March 21, 1944, Serial No. 527,501

3 Claims. (Cl. 73—371)

This invention relates to improvements in an index for thermometers and it consists in the novel features which are hereinafter described.

One of the objects of my invention is to provide the index for a glass tube thermometer with a metal spring which is adjustable to compensate for variation in the bore diameter of the various thermometer tubes.

Another object is to provide the index of a thermometer with a spring of relatively great strength which is normally indestructible.

A further object is to provide a thermometer with an index having a cylindrical float or body of metal whereby the index may have its weight reduced as compared with an index having a glass float or body.

A still other object of my invention is to provide a thermometer with a metal index which may be heat treated for ready visibility.

A still other object is to provide the metal float of a thermometer with a foot at the lower end thereof, to receive thereon the pressure of the mercury of the thermometer, to be forced upward thereby, and to prevent the column of mercury from rising past the index, whereby the index may be moved upwards as the mercury column rises in the thermometer tube, the reaction of the mercury to the inner walls of the tube keeping the mercury from rising past the foot of the float.

Other objects and advantages will hereinafter appear.

I attain these objects by the index for thermometers, which is shown in the accompanying drawing or by any mechanical equivalent or obvious modification of the same.

In the drawing, Fig. 1 is a fragmentary front view in elevation of a U-shaped thermometer, omitting the mercury and the engravings on the glass of the thermometer tube and showing only a few temperature points on each of the two legs of the thermometer.

Fig. 1 is drawn to an enlarged scale.

Fig. 2 is a vertical sectional view of one form of my index for thermometers; and Fig. 3 is a top plan view of the same drawn to a larger scale than Fig. 2, except that the thicknesses of metal are drawn to the same scale as Fig. 2.

Similar numerals refer to similar parts throughout the several views of the drawing.

11 and 12 designate the two legs of a U-shaped thermometer; the leg 11 terminates at the upper end thereof in an enlargement or bulb 13 which is filled with a suitable liquid such as alcohol, and the leg 12 terminates at the upper end thereof in a smaller bulb 14 which is partly filled with alcohol.

The legs 11 and 12 with the base 15 of the U-tube have therein extending therethrough a relatively narrow bore or passage 16 which is normally partly filled with mercury.

The expansion of the alcohol in the bulb 13 depresses the column of mercury in the leg 11 and raises the column of the mercury in the leg 12.

The temperatures are engraved on both legs and are read downwardly on the leg 11 and upwardly on the leg 12, as shown.

To indicate the maximum and minimum temperatures attained a device known as an index is employed and is placed in each of the legs 11 and 12; the device consists of a float and a friction member connected thereto or integral therewith; the float is pushed upwardly by the column of mercury when the latter rises in either leg 11 or 12 and the friction member retains the index in position when the column of mercury under the index recedes or falls.

In the form of my improved index, which is shown in Figs. 2 and 3, 46 and 47 are two vertical walls of a float 46—47 which are positioned at right angles to each other; the wall 46 terminates at the lower end thereof in a circular foot 48 and at the upper end thereof in a corrugation 50 and an inclined flange 51 which has welded thereto the upper end of a spring 49 which is shown in dot and dash lines 49a as initially straight and which becomes curved when inserted into the passage 16; the latter is also indicated in dot and dash lines in Figs. 2 and 3.

By bending the flange 51 to a greater or lesser angle of inclination, clockwise in Fig. 2, the spring 49 will become respectively more or less curved in the passage 16 and thereby also more or less stressed. The corrugation 50 serves to facilitate the bending of the flange 51.

The foot 48 receives thereon the upward pressure of the mercury, thereby serving to raise the float 46—47, but not to lower it; the reaction of the glass to mercury keeps it from passing upward between the periphery of the foot 48 and the walls of the passage 16.

The form of my index which is shown in Figs. 2 and 3 can be more readily adjusted for friction in the passage 16 of the thermometer tube by adjusting the angle of inclination of the flange 51.

My improved index may be employed with other than U-shaped thermometers.

Variations are possible and parts of my invention may be used without other parts; I do not, therefore restrict myself to the details as shown.

I claim as my invention and desire to secure by Letters Patent:

1. An index for thermometers, to be mounted in the bore of a thermometer and comprising a float, having thereon at the upper end thereof an inclined flange, adapted to be set to a desired angle of inclination to said float and a leaf spring secured at the upper end thereof to the flange, to be stressed in said bore to a desired extent by adjusting the initial inclination of said flange with relation to said float.

2. An index for thermometers to be mounted in the bore of a thermometer and comprising a float having thereon at the upper end thereof a bendable corrugation, an inclined flange at the upper end thereof, and a leaf spring secured at the upper end thereof to the flange to be stressed in said bore to a desired extent by adjusting the inclination of said flange with relation to said float and said corrugation facilitating the said adjustment.

3. An index for thermometers to be mounted in the bore of a thermometer comprising a metal float having thereon a pair of walls placed at an angle to each other, one of said walls having at the upper end thereof a corrugation, an inclined flange at the upper end thereof and an initially straight leaf spring secured at the upper end thereof to the flange, to become curved in the bore of said thermometer and stressed to a desired extent by adjusting the inclination of said flange with relation to said float and said corrugation facilitating the said adjustment.

JOSEPH KAHL.